United States Patent
Chung (10) Patent No.: US 10,960,436 B2
(45) Date of Patent: Mar. 30, 2021

(54) ELASTIC MEMBER STRUCTURE AND LINEAR VIBRATION MOTOR USING THE SAME

(71) Applicant: Mplus CO., LTD., Suwon-si (KR)

(72) Inventor: Seuk Hwan Chung, Suwon-si (KR)

(73) Assignee: MPLUS CO., LTD., Suwon-si (KR)

( * ) Notice: Subject to any disclaimer, the term of this patent is extended or adjusted under 35 U.S.C. 154(b) by 0 days.

(21) Appl. No.: 16/445,465

(22) Filed: Jun. 19, 2019

(65) Prior Publication Data
US 2020/0016630 A1    Jan. 16, 2020

(30) Foreign Application Priority Data

Jul. 11, 2018  (KR) .......................... 10-2018-0080643

(51) Int. Cl.
| | |
|---|---|
| *B06B 1/04* | (2006.01) |
| *H02K 7/065* | (2006.01) |
| *H02K 33/18* | (2006.01) |
| *H02K 33/16* | (2006.01) |
| *H02K 33/00* | (2006.01) |

(52) U.S. Cl.
CPC ............. *B06B 1/045* (2013.01); *H02K 7/065* (2013.01); *H02K 33/18* (2013.01); *H02K 33/00* (2013.01); *H02K 33/16* (2013.01)

(58) Field of Classification Search
CPC ........ H02K 7/065; H02K 33/00; H02K 33/16; H02K 33/18; B06B 1/045
USPC .................................... 310/12.14, 15, 25, 26
See application file for complete search history.

(56) References Cited

U.S. PATENT DOCUMENTS

| | | | | |
|---|---|---|---|---|
| 2006/0001324 | A1* | 1/2006 | Won ........................ | H02K 33/16 310/81 |
| 2009/0121559 | A1* | 5/2009 | Lee ......................... | H02K 33/02 310/28 |
| 2010/0127581 | A1* | 5/2010 | Yun .......................... | B06B 1/045 310/25 |
| 2011/0198948 | A1* | 8/2011 | Keisuke .................. | B06B 1/045 310/25 |

(Continued)

FOREIGN PATENT DOCUMENTS

| | | |
|---|---|---|
| CN | 205407550 U | 7/2016 |
| JP | 2011-011138 A | 1/2011 |
| KR | 10-0941292 B1 | 2/2010 |

(Continued)

OTHER PUBLICATIONS

SIPO Office Action, dated Dec. 28, 2020, for Chinese Patent Application No. 201910625388.7 which corresponds to the above-identified U.S. application.

*Primary Examiner* — Tulsidas C Patel
*Assistant Examiner* — Rashid H Johnson
(74) *Attorney, Agent, or Firm* — LRK Patent Law Firm (57) ABSTRACT

An elastic member structure includes: a loop type inner plate; a loop type outer plate having the same center as the loop type inner plate; and a plurality of spiral elastic plates connected to the loop type inner plate and the loop type outer plate and having given elasticity, wherein the loop type outer plate includes a plurality of first areas having areas connected to the ends of the plurality of spiral elastic plates and a plurality of second areas formed between the plurality of first areas and the outer size of each first area of the loop type outer plate is greater than the outer size of each second area thereof.

5 Claims, 7 Drawing Sheets

(56) References Cited

U.S. PATENT DOCUMENTS

2012/0169153 A1*  7/2012  Ueda .................. H02K 33/16
                                                          310/25
2015/0123499 A1*  5/2015  Park .................. H02K 33/16
                                                          310/25

FOREIGN PATENT DOCUMENTS

| KR | 10-2011-0112009 A | 10/2011 |
| KR | 10-2013-0009541 A | 1/2013 |
| KR | 10-2013-0042170 A | 4/2013 |
| KR | 10-1754336 B1 | 7/2017 |
| KR | 10-2018-0023199 A | 3/2018 |

* cited by examiner

ELASTIC MEMBER STRUCTURE AND LINEAR VIBRATION MOTOR USING THE SAME

CROSS REFERENCE TO RELATED APPLICATION

The present application claims priority to Korean Patent Application No. 10-2018-0080643, filed in the Korean Intellectual Property Office on Jul. 11, 2018, the entire content of which is incorporated herein by reference.

BACKGROUND OF THE INVENTION

1. Field of the Invention

The present invention relates to an elastic member structure and a linear vibration motor using the same, and more particularly, to a linear vibration motor that is configured to have an elastic member improved newly in structure, thereby improving a vibrating efficiency thereof.

2. Description of Related Art

Generally, mobile terminals like smartphones have vibration functions (haptic functions) of interfacing call forwarding as well as of interfacing key input, event occurrence, and application execution to a user.

A vibration motor, which has such vibration function, is a part for converting an electromagnetic force into a mechanical driving force to generate vibrations, and the vibration motor is divided largely into a flat/coin type vibration motor and a linear type vibration motor according to its driving type and shape.

The flat type vibration motor generates vibrations by means of the rotation of a mass disposed therein and has rotational inertia remaining thereon. Accordingly, the linear vibration motor having no rotational inertia is generally used for a device requiring a fast response speed.

On the other hand, the linear vibration motor is designed to allow an electromagnetic force generated from a coil and a magnet and a physical elastic force generated from an elastic member to be resonant cooperatively with each other. In detail, if power in a specific frequency range having variable characteristics is applied to the coil to generate the electromagnetic force, the electromagnetic force and the magnetic force of the magnet are mutually operated, so that an oscillator is vibrated up and down, while being supported against the elastic force of the elastic member.

In the process where the oscillator of the linear vibration motor is vibrated up and down, however, if the vibration strength is increased, noise occurs from the oscillator. To solve the above-mentioned problem, the elastic member, which has a relatively large space to help the oscillator gently vibrated up and down, is welded to top or underside of the linear vibration motor, thereby ensuring the volume of the top or underside thereof. In the welding process, however, the outer peripheral area of the elastic member may become loose, which undesirably makes the vibration efficiency of the linear vibration motor deteriorated.

Accordingly, there is a need for an elastic member structure and a linear vibration motor having the same that are capable of efficiently ensuring an internal space of the linear vibration motor to allow an oscillator to gently perform up and down vibrations.

SUMMARY OF THE INVENTION

Accordingly, the present invention has been made in view of the above-mentioned problems occurring in the related art, and it is an object of the present invention to provide an elastic member structure and a linear vibration motor having the same that are capable of reducing physical collision with an oscillator of the linear vibration motor in a process where the oscillator performs up and down vibrations.

It is another object of the present invention to provide an elastic member structure and a linear vibration motor using the same that are capable of adjusting widths in outer peripheral supporting areas of the elastic member structure, thereby lowering the stress generated from the elastic member structure while the linear vibration motor is being driven.

The technical problems to be achieved through the present invention are not limited as mentioned above, and other technical problems not mentioned herein will be obviously understood by one of ordinary skill in the art through the following description.

To accomplish the above-mentioned objects, according to one aspect of the present invention, there is provided an elastic member structure including: a loop type inner plate; a loop type outer plate having the same center as the loop type inner plate; and a plurality of spiral elastic plates connected to the loop type inner plate and the loop type outer plate and having given elasticity, wherein the loop type outer plate includes a plurality of first areas having areas connected to the ends of the plurality of spiral elastic plates and a plurality of second areas formed between the plurality of first areas and the outer size of each first area of the loop type outer plate is greater than the outer size of each second area thereof.

According to the present invention, desirably, the loop type outer plate has a plurality of concave grooves formed on the inner peripheral surface of each first area, each concave groove having a given radius of curvature.

According to the present invention, desirably, a minimum angle at which each first area of the loop type outer plate is formed around the center of the loop type inner plate is the same as an angle formed between a first imaginary line connecting the center of the loop type inner plate with a center point of the concave groove and a second imaginary line connecting the center of the loop type inner plate with a center point formed on the end of an outer slot formed on each spiral elastic plate.

According to the present invention, desirably, the plurality of spiral elastic plates are connected to the loop type inner plate in such a manner as to be equally spaced apart from each other around the center O1 of the loop type inner plate.

According to the present invention, desirably, the loop type inner plate, the loop type outer plate, and the plurality of spiral elastic plates are made of the same material as each other.

To accomplish the above-mentioned objects, according to the other aspect of the present invention, there is provided a linear vibration motor having an internal space formed by means of a casing and a bracket to generate vibrations with an electromagnetic force generated between an oscillator and a stator, including an elastic member structure disposed on the bracket to support the oscillator, the elastic member structure including: a loop type inner plate coming into contact with the oscillator; a loop type outer plate having the same center as the loop type inner plate and coming into contact with the bracket; and a plurality of spiral elastic plates connected to the loop type inner plate and the loop type outer plate, wherein the loop type outer plate includes a plurality of first areas having areas connected to the ends of the plurality of spiral elastic plates and a plurality of second areas formed between the plurality of first areas, and the outer size of each first area of the loop type outer plate is greater than the outer size of each second area thereof.

According to the present invention, desirably, the elastic member structure further includes a plurality of concave grooves formed on the inner peripheral surface of each first area, each concave groove having a given radius of curvature.

According to the present invention, desirably, the elastic member structure has a minimum angle at which each first area of the loop type outer plate is formed around the center of the loop type inner plate, the minimum angle being the same as an angle formed between a first imaginary line connecting the center of the loop type inner plate with a center point of the concave groove and a second imaginary line connecting the center of the loop type inner plate with a center point formed on the end of an outer slot formed on each spiral elastic plate.

According to the present invention, desirably, the loop type outer plate of the elastic member structure is weldedly contacted with the bracket, and the minimum number of welded points of the loop type outer plate to the bracket is equal to the number of spiral elastic plates.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, the present invention is in detail explained with reference to the attached drawings. In the description, it should be noted that the parts corresponding to those of the drawings are indicated by corresponding reference numerals. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms.

All terms (including technical or scientific terms) used herein, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification. An expression referencing a singular value additionally refers to a corresponding expression of the plural number, unless explicitly limited otherwise by the context.

In this application, terms, such as "comprise", "include", or 'have', are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Figure 1:
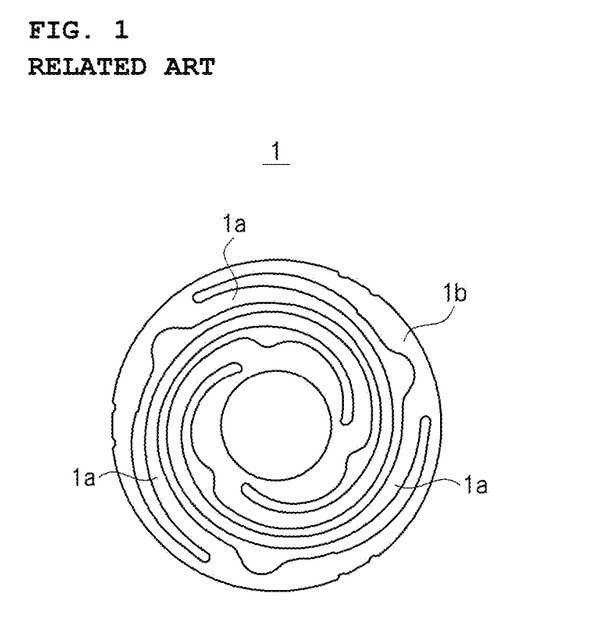
FIG. 1 shows a structure of a conventional elastic member.
Figure 2:
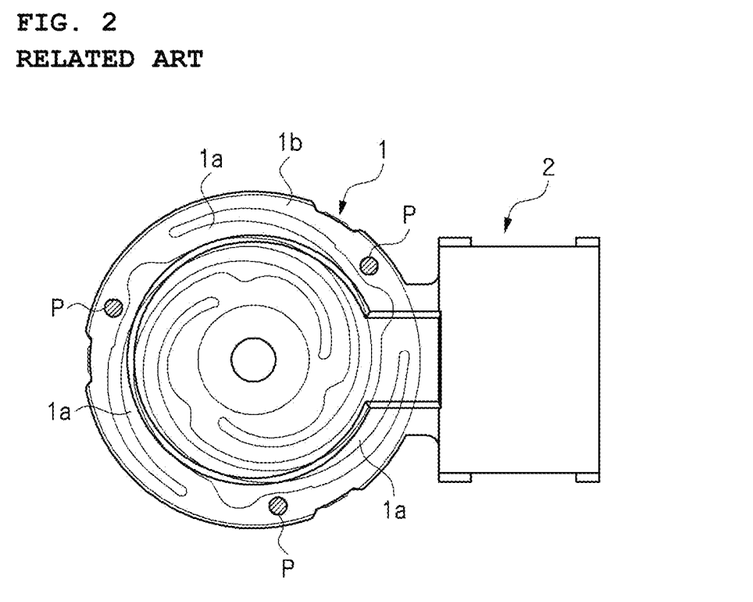
FIG. 2 shows a state where the conventional elastic member is welded to a bracket of a linear vibration motor.

FIG. 1 shows a structure of a conventional elastic member 1, and FIG. 2 shows a state where the conventional elastic member 1 is welded to a bracket 2 of a linear vibration motor.

As shown in FIG. 1, the conventional elastic member 1 includes a plurality of spiral elastic plates 1a equally spaced apart from each other to form arches and a loop type outer support 1b connected to the plurality of spiral elastic plates 1a. Also, the elastic member 1 has the same circular shape in an outer diameter thereof.

As shown in FIG. 2, if the conventional elastic member 1 is welded to the bracket 2 of the linear vibration motor, welding (for example, laser welding) using heat is applied to areas P close to areas where the plurality of spiral elastic plates 1a are connected to the loop type outer support 1b.

However, unfortunately, a portion of the areas where the plurality of spiral elastic plates 1a are connected to the loop type outer support 1b may be deformed due to high heat applied momentarily to the elastic member 1 in a process where the elastic member 1 is welded to the bracket 2.

Figure 3A:
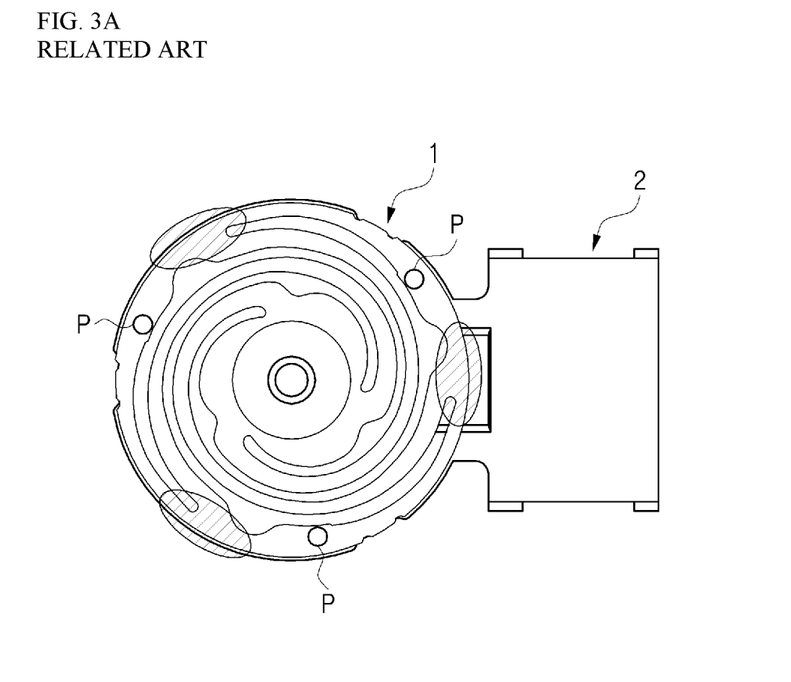
FIGS. 3A and 3B are photographs showing the state where the conventional elastic member is welded to the bracket of the linear vibration motor.
Figure 3B:
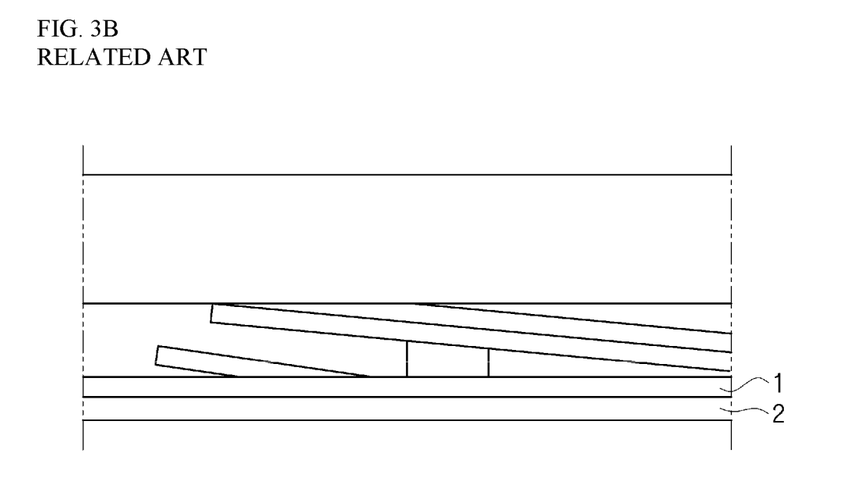

FIGS. 3A and 3B are photographs showing the state where the conventional elastic member 1 is welded to the bracket 2 of the linear vibration motor.

As shown in FIG. 3A, it can be checked that heat deformation occurs on hatched areas around the welded areas P where the conventional elastic member 1 is physically coupled to the bracket 2.

In more detail, as shown in FIG. 3B, it can be checked that the conventional elastic member 1 mounted on the bracket 2 is spaced apart from the bracket 2 by a given distance, so that the linear vibration motor having the conventional elastic member 1 may have a deviation in the internal space between top and underside thereof.

Up to now, an explanation on the problems occurring in the process of welding the conventional elastic member 1 to the bracket 2 of the linear vibration motor has been given, and now, an elastic member structure 100 according to the present invention capable of solving the above problems will be explained.

Figure 4A:
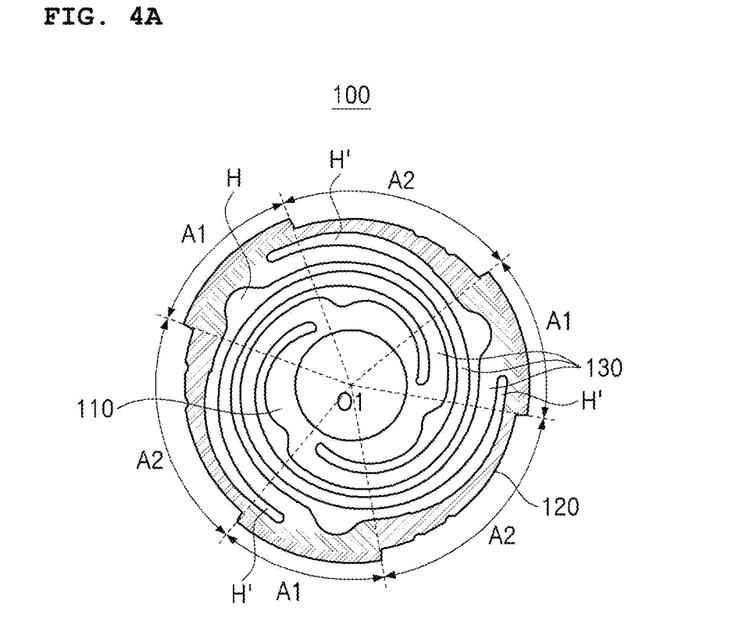
FIGS. 4A and 4B show an elastic member structure according to a first embodiment of the present invention.
Figure 4B:
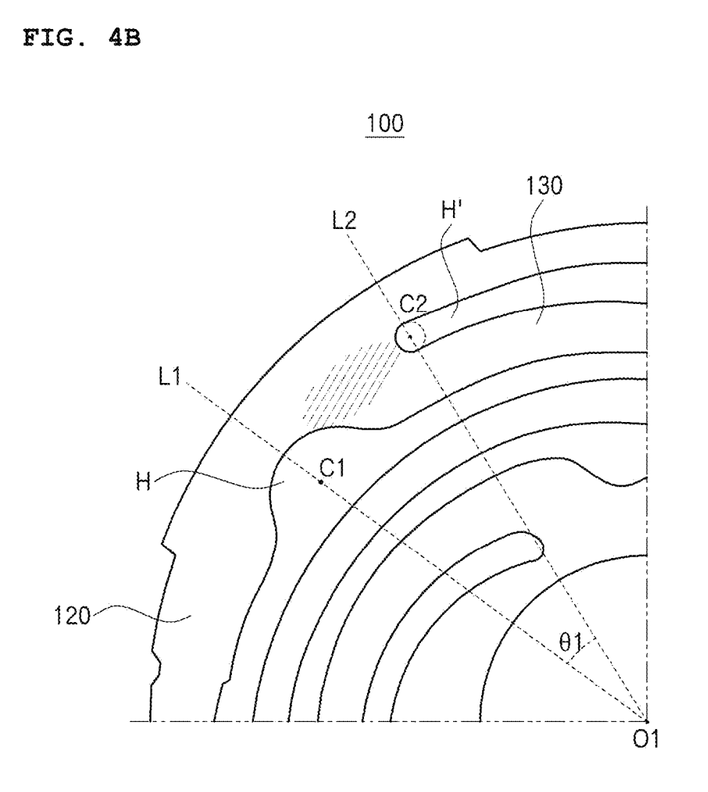

FIGS. 4A and 4B show the elastic member structure 100 according to a first embodiment of the present invention.

As shown in FIG. 4A, the elastic member structure 100 according to the first embodiment of the present invention includes a loop type inner plate 110, a loop type outer plate 120 having the same center O1 as the loop type inner plate 110, and a plurality of spiral elastic plates 130 connected to the loop type inner plate 110 and the loop type outer plate 120 and having given elastic forces. The plurality of spiral elastic plates 130 are connected to the loop type inner plate 110 in such a manner as to be equally spaced apart from each other around the loop type inner plate 110.

Further, the plurality of spiral elastic plates 130 have a spiral structure between the loop type inner plate 110 and the loop type outer plate 120, and accordingly, spiral-shaped outer slots H' are formed on the outer peripheries of the plurality of spiral elastic plates 130.

The plurality of spiral elastic plates 130 apply elastic restoring forces to an object supported against the elastic member structure 100, and also, the plurality of spiral elastic plates 130 are equally spaced apart from each other with respect to the center O1 of the loop type inner plate 110, so that the object can be vibrated up and down, without being inclined to one side.

On the other hand, the loop type outer plate 120 is divided into a plurality of first areas A1 having areas connected to the ends of the plurality of spiral elastic plates 130 and a plurality of second areas A2 formed between the plurality of first areas A1. Also, the loop type outer plate 120 has different outer sizes by area, and for example, a distance between the center of the elastic member structure 100 and the outer periphery of each first area A1 of the loop type outer plate 120 is greater than a distance between the center of the elastic member structure 100 and the outer periphery of each second area A2 of the loop type outer plate 120.

In detail, an area of the loop type outer plate 120 where the application of elasticity from the plurality of spiral elastic plates 130 starts, that is, the outer size of each first area A1 of the loop type outer plate 120, is greater than that of each second area A2 thereof.

Further, the loop type outer plate 120 has a plurality of concave grooves H formed on the inner peripheral surface thereof and having given radiuses of curvature, and a vibration frequency of the elastic member structure 100 can be compensated according to the sizes of the concave grooves H. The concave grooves H may be semi-circular.

According to the present invention, the area (that is, area A1) on which each concave groove H is formed on the entire area of the loop type outer plate 120 has an outer size greater than the area on which each concave groove H is not formed, so that the width of the loop type outer plate 120 reduced by the formation of each concave groove H is compensated to reduce the deformation caused by the heat applied to the loop type outer plate 120.

As shown in FIG. 4B, a minimum angle θ1 at which each first area A1 of the loop type outer plate 120 is formed is obtained using a position (hatched area) connected to the end of the corresponding spiral elastic plate 130 and a position of the corresponding concave groove H. In more detail, the minimum angle θ1 at which each first area A1 of the loop type outer plate 120 is formed around the center O1 of the loop type inner plate 110 is the same as an angle formed between a first imaginary line L1 connecting the center O1 of the loop type inner plate 110 with a center point C1 of the concave groove H and a second imaginary line L2 connecting the center O1 of the loop type inner plate 110 with a circular center point C2 formed on the end of the spiral-shaped outer slot H' coming into contact with the loop type outer plate 120.

On the other hand, if an angle at which each first area A1 of the loop type outer plate 120 is formed is less than the minimum angle θ1, deformation caused by heat on the elastic member structure 100 may be more seriously generated than that on the conventional elastic member 1 having the same outer diameter, and accordingly, the angle at which each first area A1 of the loop type outer plate 120 is formed is desirably greater than the minimum angle θ1.

Figure 5A:
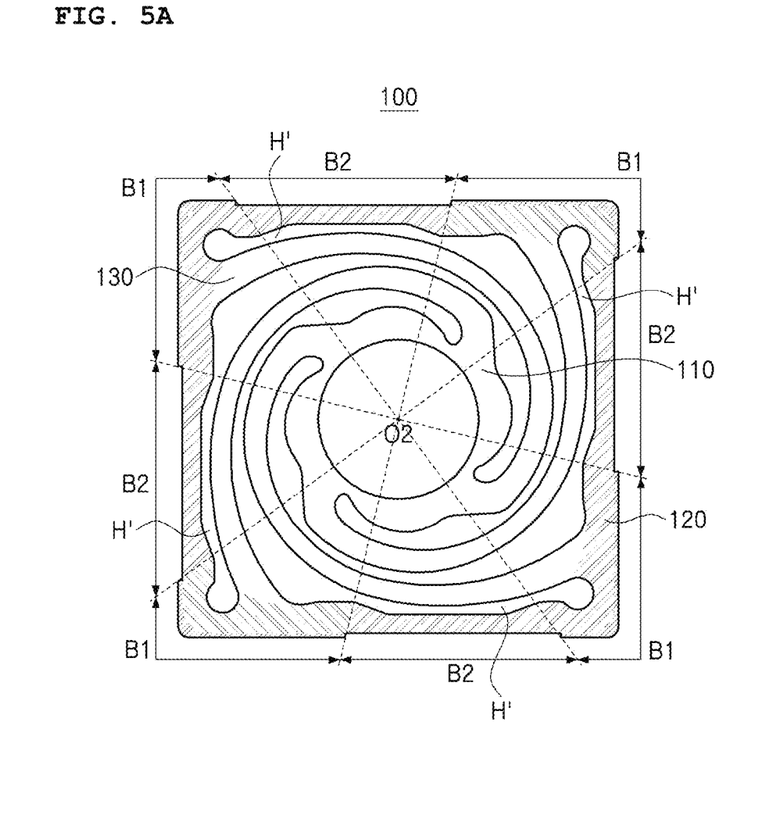
FIGS. 5A and 5B show an elastic member structure according to a second embodiment of the present invention.
Figure 5B:
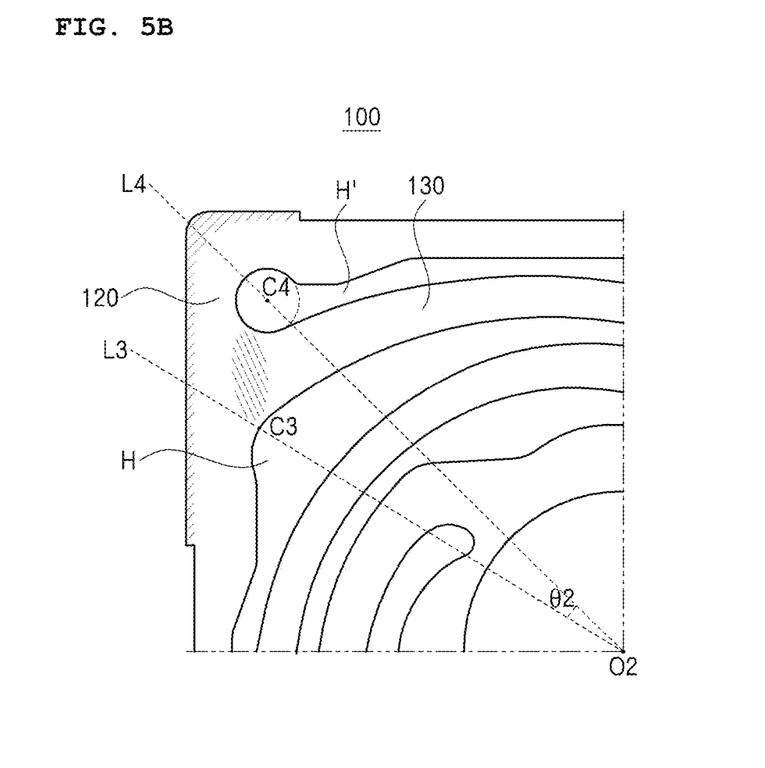

FIGS. 5A and 5B show an elastic member structure 100 according to a second embodiment of the present invention.

As shown in FIG. 5A, the elastic member structure 100 according to the second embodiment of the present invention includes a circular loop type inner plate 110, a square loop type outer plate 120 having the same center O2 as the circular loop type inner plate 110, and a plurality of spiral elastic plates 130 connected to the circular loop type inner plate 110 and the square loop type outer plate 120. The number of spiral elastic plates 130 is at least four or more, and the spiral elastic plates 130 are connected to the circular loop type inner plate 110 in such a manner as to be equally spaced apart from each other around the circular loop type inner plate 110. Accordingly, an object can be vibrated up and down through the elastic member structure 100, without being inclined to one side.

Further, the plurality of spiral elastic plates 130 have a spiral structure between the circular loop type inner plate 110 and the square loop type outer plate 120, and accordingly, spiral-shaped outer slots H' are formed on the outer peripheries of the plurality of spiral elastic plates 130.

The square loop type outer plate 120 is divided into a plurality of first areas B1 having areas connected to the ends of the plurality of spiral elastic plates 130 and a plurality of second areas B2 formed between the plurality of first areas B1. Also, the square loop type outer plate 120 has different outer sizes by area, and for example, an outer size of each first area B1 of the square loop type outer plate 120 is greater than that of each second area B2 thereof.

The square loop type outer plate 120 is connected to the plurality of spiral elastic plates 130, and each first area B1 of the loop type outer plate 120, on which the application of elasticity from the plurality of spiral elastic plates 130 starts, has an outer size greater than each second area B2 thereof, so that deformation caused by the heat applied to the elastic member structure 100 can be reduced.

Further, the square loop type outer plate 120 has a plurality of concave grooves H formed on the inner surfaces thereof, and the concave grooves H have given radiuses of curvature, so that a vibration frequency of the elastic member structure 100 can be compensated according to the sizes of the concave grooves H.

According to the present invention, the area (that is, area B1) on which each concave groove H is formed on the entire area of the square loop type outer plate 120 has an outer size greater than the area on which each concave groove H is not formed, so that the width of the square loop type outer plate 120 reduced by the formation of each concave groove H is compensated to reduce the deformation caused by the heat applied to the square loop type outer plate 120.

Further, as shown in FIG. 5B, a minimum angle at which each first area B1 of the square loop type outer plate 120 is formed is obtained using a position (hatched area) connected to the end of the corresponding spiral elastic plate 130 and a position of the corresponding concave groove H. In more detail, the minimum angle θ2 at which each first area B1 of the square loop type outer plate 120 is formed around the center O2 of the circular loop type inner plate 110 is the same as an angle formed between a first imaginary line L3 connecting the center O2 of the circular loop type inner plate 110 with the smallest point C3 in radius of curvature of the concave groove H and a second imaginary line L4 connecting the center O2 of the circular loop type inner plate 110 with a circular center point C4 formed on the end of the spiral-shaped outer slot H' coming into contact with the square loop type outer plate 120.

The elastic member structures 100 according to the first and second embodiments of the present invention are configured to have the loop type inner plates 110, the loop type outer plates 120, and the plurality of spiral elastic plates 130 made of the same material as each other, so that an efficiency in the process of making the elastic member structures 100 can be improved.

Figure 6:
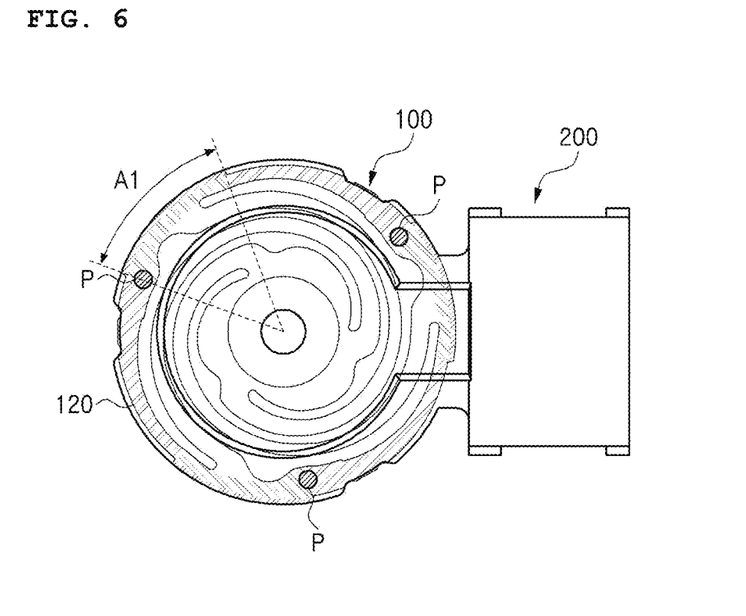
FIG. 6 shows a state where the elastic member structure according to the first embodiment of the present invention is welded to a bracket of a linear vibration motor.

FIG. 6 shows a state where the elastic member structure 100 according to the first embodiment of the present invention is welded to a bracket 200 of a linear vibration motor.

As shown in FIG. 6, the loop type outer plate 120 is relatively large in width on the areas having the welded points P to the bracket 200. Accordingly, deformation caused by heat can be minimized.

Further, the minimum number of welded points P of the loop type outer plate 120 to the bracket 200 is equal to the number of spiral elastic plates 130, so that the internal space of the linear vibration motor can be sufficiently ensured.

Up to now, an explanation on the elastic member structures 100 according to the first and second embodiments of the present invention has been given, and now, a linear vibration motor 1000 in which the elastic member structure 100 according to the first embodiment of the present invention is adopted will be explained.

Figure 7:
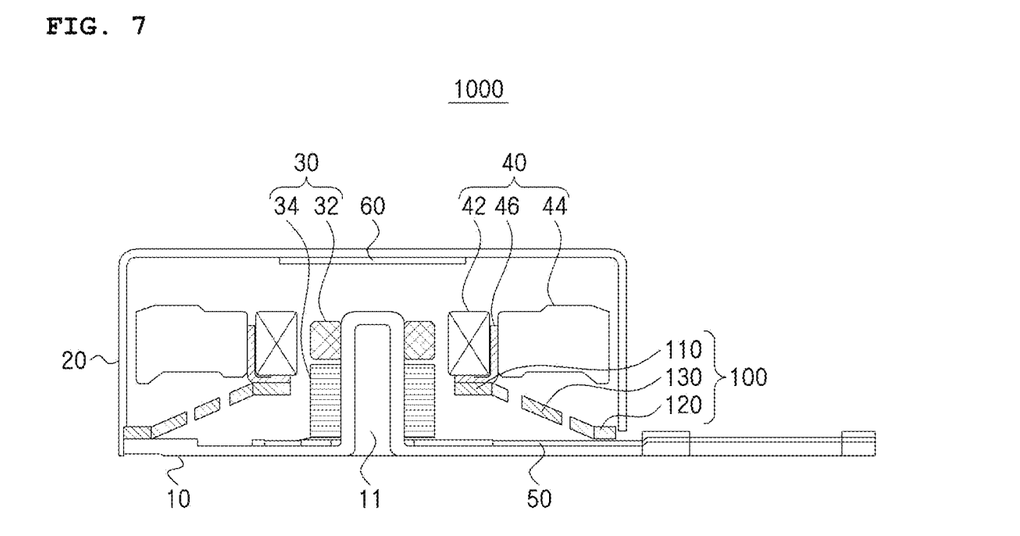
FIG. 7 is a sectional view showing the linear vibration motor having the elastic member structure according to the first embodiment of the present invention.

FIG. 7 is a sectional view showing the linear vibration motor 1000 having the elastic member structure 100 according to the first embodiment of the present invention.

As shown in FIG. 7, the linear vibration motor 1000 according to the present invention includes a bracket 10, a casing 20, a stator 30, an oscillator 40, the elastic member structure 100, and a substrate 50. The linear vibration motor 1000 according to the present invention has an internal space formed by means of the bracket 10 and the casing 20 and generates vibrations by means of an electromagnetic force generated between the oscillator 40 and the stator 30.

The bracket 10 has a stator support 11 formed on the center thereof to seat the stator 30 thereon. Further, the bracket 10 may be an acoustic diaphragm which is vibrated by means of the electromagnetic force generated between the oscillator 40 and the stator 30 to thus generate sounds. Moreover, as shown in FIG. 7, the linear vibration motor 1000 according to the present invention is configured to allow the stator support 11 to be insertedly formed inwardly from the center of the bracket 10, but of course, a separate component like a center yoke may be insertedly fitted to the center of the bracket 10 to support the components like the stator 30 disposed inside the linear vibration motor 1000.

The casing 20 has an internal space in which the stator 30, the oscillator 40 and the elastic member structure 100 for linear motions are housed, and the bracket 10 is welded to top or underside of the casing 20 to seal the space formed by the casing 20. To do this, the casing 20 is open on any one of top and underside thereof.

The casing 20 has a cylindrical shape, but it may have a shape of a square casing or polygonal casing, while being not necessarily limited thereto. Also, the bracket 10 welded to the casing 20 and the elastic member structure 100 housed in the casing 20 have the same square or polygonal shape as the casing 20.

The stator 30 includes a coil 34 and a coil yoke 32. According to the present invention, the coil 34 and the coil yoke 32 are fittedly disposed to the outer peripheral surface of the stator support 11, and the coil comes into contact with the substrate 50 as will be discussed later in such a manner as to be electrically connected to the substrate 50. For example, the coil 34 may be a sound coil that generates magnetic fields having different directions and strengths. In more detail, if an alternating current is applied to the coil 34 through the substrate 50, an alternating magnetic field is generated from the coil 34, so that the bracket 10 coming into contact with the coil 34 is vibrated to a signal in an audible frequency range, thereby generating sounds.

The coil yoke 32 is fittedly disposed on the outer peripheral surface of the stator support 11 in parallel with the coil 34 and serves to amplify the electromagnetic force generated from the coil 34.

The oscillator 40 is located around the coil 34 and includes a magnet 42, a weight 44, and a yoke 46. If the alternating current is applied to the stator 30 through the substrate 50, an alternating magnetic field is generated from the coil 34, and accordingly, the magnet 42 is cooperatively operated with the alternating magnetic field, so that the magnet 42 is vibrated up and down. The magnet 42 can be driven with different vibration forces according to variations of the alternating current.

Though the magnet 42 is one in FIG. 7, it may include two or more magnets coupled to each other. If the two or more magnets are coupled to each other, the electromagnetic force can be stronger than that generated from one magnet.

The weight 44 of the oscillator 40 is disposed around the magnet 42 and serves to amplify the up and down vibrations of the magnet 42 by means of its self weight. Further, an outer diameter of the weight 44 is smaller than an inner diameter of the bracket 20, so that in a process where the entire oscillator 40 is vibrated up and down, the contact of the oscillator 40 with the bracket is prevented to ensure the reliability of the linear vibration motor 1000.

The yoke 46 of the oscillator 40 is disposed between the magnet 42 and the weight 44, and otherwise, it may be disposed on top or underside of the magnet 42. According to the present invention, the yoke 46 serves to form a closed magnetic circuit capable of allowing the magnetic field generated from the magnet 42 to gently flow.

Next, the elastic member structure 100 is disposed on the bracket 10 to support the oscillator 40. According to the present invention, the elastic member structure 100 includes a loop type inner plate 110 disposed on top thereof, a loop type outer plate 120 disposed on bottom thereof and having the same center as the loop type inner plate 110, and a plurality of spiral elastic plates 130 connected to the loop type inner plate 110 and the loop type outer plate 120 and having given elasticity. In more detail, the loop type inner plate 110 comes into contact with the oscillator 40 and has the inner diameter larger than the outer diameter of the stator support 11. Also, the loop type outer plate 120 is fixed to one surface of the bracket 10, and the plurality of spiral elastic plates 130 serve to support the up and down motions of the oscillator and to amplify the up and down vibrations of the oscillator 40 by means of the given elasticity thereof.

Further, the loop type outer plate 120 of the elastic member structure 100 is welded to the bracket and has different widths on the areas coming into contact with the bracket 10, so that the elastic member structure 100 and the bracket 10 can be coupled to each other, without any gap, thereby ensuring the space in which the oscillator 40 can be vibrated up and down.

Next, the substrate 50 is disposed on top of the bracket 10 in such a manner as to allow a portion thereof to be exposed outward from the space formed by the bracket 10 and the casing 20 to receive power from the outside. Further, the substrate 50 supplies the power received from the outside to the stator 30.

Further, the linear vibration motor 1000 further includes a buffering member 60 disposed on top of the internal space thereof to absorb the impacts applied directly to the casing 20 by means of the up and down motions of the oscillator 40 and to suppress the generation of noise caused by the vibrations.

As described above, the elastic member structure according to the present invention is welded to the bracket and has the different widths on the areas welded to the bracket, thereby ensuring the internal space of the linear vibration motor, reducing the generation of vibration noise caused by the up and down motions of the oscillator, and improving the efficiency in occurrence of vibrations of the linear vibration motor.

In addition, the elastic member structure according to the present invention can prevent deformation from occurring in a process of being welding to the interior of the linear vibration motor, thereby maintaining a previously set resonance frequency thereof.

Further, the elastic member structure according to the present invention can allow the widths of the areas welded to the bracket to be larger than those of the areas not welded to the bracket, thereby lowering the stress generated therefrom to improve reliability in lifespan of the linear vibration motor.

Furthermore, the elastic member structure according to the present invention can allow the widths of the areas welded to the bracket to be larger than those of the areas not welded to the bracket, thereby ensuring the internal space in which the oscillator of the linear vibration motor moves up and down to prevent the physical collision with the oscillator.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An elastic member structure comprising:
   a loop type inner plate (110);
   a loop type outer plate (120) having the same center as the loop type inner plate (110); and
   a plurality of spiral elastic plates (130) connected to the loop type inner plate (110) and the loop type outer plate (120) and having given elasticity,
   wherein the loop type outer plate (120) comprises a plurality of first areas (A1) having areas connected to the ends of the plurality of spiral elastic plates (130) and a plurality of second areas (A2) formed between the plurality of first areas (A1) and the outer size of each first area (A1) of the loop type outer plate (120) is greater than the outer size of each second area (A2) thereof,
   wherein the loop type outer plate (120) has a plurality of concave grooves (H) formed on the inner peripheral surface of each first area (A1), each concave groove having a given radius of curvature, and
   wherein a minimum angle (θ1) at which each first area (A1) of the loop type outer plate (120) is formed around the center (O1) of the loop type inner plate (110) is the same as an angle formed between a first imaginary line (L1) connecting the center (O1) of the loop type inner plate (110) with a center point (C1) of the concave groove (H) and a second imaginary line (L2) connecting the center (O1) of the loop type inner plate (110) with a center point (C2) formed on the end of an outer slot (H') formed on each spiral elastic plate (130).

2. The elastic member structure according to claim 1, wherein the plurality of spiral elastic plates (130) are connected to the loop type inner plate (110) in such a manner as to be equally spaced apart from each other around the center (O1) of the loop type inner plate (110).

3. The elastic member structure according to claim 1, wherein the loop type inner plate (110), the loop type outer plate (120), and the plurality of spiral elastic plates (130) are made of the same material as each other.

4. A linear vibration motor (1000) having an internal space formed by means of a casing (20) and a bracket (10) to generate vibrations with an electromagnetic force generated between an oscillator (40) and a stator (30), comprising an elastic member structure (100) disposed on the bracket (10) to support the oscillator (40), the elastic member structure (100) comprising:
   a loop type inner plate (110) coming into contact with the oscillator (40);
   a loop type outer plate (120) having the same center as the loop type inner plate (110) and coming into contact with the bracket (10); and
   a plurality of spiral elastic plates (130) connected to the loop type inner plate (110) and the loop type outer plate (120), wherein the loop type outer plate (120) comprises a plurality of first areas (A1) having areas connected to the ends of the plurality of spiral elastic plates (130) and a plurality of second areas (A2) formed between the plurality of first areas (A1) and the outer size of each first area (A1) of the loop type outer plate (120) is greater than the outer size of each second area (A2) thereof,
   wherein the elastic member structure (100) further comprises a plurality of concave grooves (H) formed on the inner peripheral surface of each first area (A1), each concave groove (H) having a given radius of curvature, and
   wherein the elastic member structure (100) has a minimum angle (θ1) at which each first area (A1) of the loop type outer plate (120) is formed around the center (O1) of the loop type inner plate (110), the minimum angle (θ1) being the same as an angle formed between a first imaginary line (L1) connecting the center (O1) of the loop type inner plate (110) with a center point (C1) of the concave groove (H) and a second imaginary line (L2) connecting the center (O1) of the loop type inner plate (110) with a center point (C2) formed on the end of an outer slot (H') formed on each spiral elastic plate (130).

5. The linear vibration motor according to claim 4, wherein the loop type outer plate (120) of the elastic member structure (100) is weldedly contacted with the bracket (10), and the minimum number of welded points (P) of the loop type outer plate (120) to the bracket (10) is equal to the number of spiral elastic plates (130).

* * * * *